(12) United States Patent
Tamber et al.

(10) Patent No.: US 6,218,024 B1
(45) Date of Patent: Apr. 17, 2001

(54) MULTILAYER PLASTIC FILM

(75) Inventors: Harinder Tamber; Mirek Planeta, both of Mississauga (CA)

(73) Assignee: Macro Engineering & Technology Inc., Mississauga (CA)

( * ) Notice: Subject to any disclaimer, the term of this patent is extended or adjusted under 35 U.S.C. 154(b) by 0 days.

(21) Appl. No.: 09/325,723

(22) Filed: Jun. 4, 1999

(51) Int. Cl.$^7$ .................................................. B32B 27/08
(52) U.S. Cl. ........................ 428/520; 428/518; 428/35.4; 428/36.6; 428/36.7
(58) Field of Search ..................... 428/520, 518, 428/35.4, 36.7, 36.6, 215, 216, 220, 910

(56) References Cited

U.S. PATENT DOCUMENTS

| | | |
|---|---|---|
| Re. 35,285 * | 6/1996 | Quacquarella et al. ............. 428/34.9 |
| 4,161,562 | 7/1979 | Yoshikawa et al. . |
| 4,469,742 | 9/1984 | Oberle et al. . |
| 4,937,139 * | 6/1990 | Genske et al. ...................... 428/349 |
| 5,061,534 * | 10/1991 | Blemberg et al. .................. 428/36.7 |
| 5,629,059 * | 5/1997 | Desai et al. ........................ 428/34.9 |
| 5,679,465 * | 10/1997 | Bekele .............................. 428/474.4 |
| 6,074,715 * | 6/2000 | Lind et al. ......................... 428/35.4 |

* cited by examiner

*Primary Examiner*—Daniel Zirker
(74) *Attorney, Agent, or Firm*—Robert F. Delbridge

(57) ABSTRACT

A multilayer plastic film has a series of component layers and bonding layers bonding said component layers together, the component layers including an inner hydrolysed ethylene vinyl acetate copolymer (EVOH) layer, an adjacent polyvinylidene chloride (PVDC) layer, and outer layers comprising a polyolefin homopolymer, copolymer or ionomer.

17 Claims, 5 Drawing Sheets

MULTILAYER PLASTIC FILM

FIELD OF THE INVENTION

This invention relates to multilayer plastic films suitable for packaging food products such as cheese, processed meat and raw meat.

BACKGROUND OF THE INVENTION

There is a need in the food packaging industry for packing film with improved structural integrity and which can be made into bags. Food products such as cheese, processed meat and raw meat are preferably packed by using film with high barrier resistance to moisture and oxygen. A typical way of protecting such food products from moisture and oxygen is by shrink packaging in high barrier film. A useful film with good moisture and oxygen barrier properties for this purposes comprises a copolymer of vinylidene chloride with a monomer such as methyl acrylate, vinyl chloride or other unsaturated monomer or hydrolysed ethylene vinyl acetate (EVOH) or any other barrier polymer which can be fabricated in the form of film and has good oxygen and moisture barrier properties.

It is known to provide a multilayer shrink film with the following structure, namely a first outer layer, a bonding layer, a barrier layer, a further bonding layer and a further outer layer to achieve the desired properties. A known multilayer film of this kind having good moisture and oxygen barrier properties for use in packaging food products has a core layer of a barrier polymer such as a copolymer of vinylidene chloride or hydrolysed ethylene vinyl acetate (EVOH) or other barrier polymer. A multilayer plastic film from which bags are to be manufactured must meet a number of criteria, such as being heat sealable, delamination resistant, and have good moisture and oxygen barrier properties. For heat shrinkable uses, the film must also be capable of shrinking from about 30 to about 50 percent at 90 degrees C. in both longitudinal and transverse directions. The film should also be capable of withstanding physical abuse during transportation.

A significant property of EVOH and polyvinylidene chloride (PVDC) based films is their barrier resistance to oxygen and other gasses. Compared to PVDC based films, EVOH based films have better barrier properties at low relative humidity, i.e. 30 to 40 percent, than commonly used multilayer films.

U.S. Pat. No. 4,469,742 (Oberle et al) describes a multilayer cook-in film with six layers. The middle barrier layer is of EVOH, selected because of its superior oxygen barrier properties compared to PVDC.

However, EVOH is hydrophillic, and therefore EVOH based films are moisture sensitive. As the moisture content of an EVOH based film increases, the permeation rate increases, i.e. barrier properties decrease, which is in contrast to PVDC based films because the permeability of PVDC does not vary with humidity, i.e. PVDC is not moisture sensitive. Accordingly therefore, EVOH based films are often produced in a multilayer structure or buried under moisture barrier materials such as polyolefins or sometimes with polyamides in order to protect an EVOH layer from moisture.

If a material with a much higher barrier layer for moisture compared to polyolefins or polyamide is used to protect an EVOH layer in a multilayer film from both the environmental and product sides thereof, the barrier properties and consequently the shelf life of the product can be increased significantly.

However, U.S. Pat. No. 4,161,562 (Yoshikawa et al) teaches that, in multilayer barrier films, a barrier layer of crystalline polymers such PVDC or EVOH has a tendency to crack if the thickness exceeds 15 microns, due to low temperature brittleness of these polymers.

It is therefore an object of the present invention to provide a multilayer plastic film which is at least substantially free from the problems referred to above.

SUMMARY OF THE INVENTION

According to the invention, a multilayer plastic film has a series of component layers and bonding layers bonding said component layers together, the component layers including an inner hydrolysed ethylene vinyl acetate copolymer (EVOH) layer, an adjacent polyvinylidene chloride (PVDC) layer, and outer layers comprising a polyolefin homopolymer, copolymer or ionomer.

The inner EVOH layer may have a thickness in the range of from about 2 to about 20 microns, preferably from about 5 to about 15 microns.

The adjacent PVDC layer may comprise from about 85 to about 98 percent by weight of vinylidene chloride, and may be selected from the group consisting of vinylidene chloride—methyl acrylate copolymer, vinylidene chloride-vinyl chloride copolymer and a copolymer of vinylidene chloride with an unsaturated monomer. The adjacent PVDC layer may have a thickness in the range of from about 2 to about 30 microns preferably from about 5 to about 15 microns.

A first outer layer may have a thickness in the range of from about 10 to about 40 microns, preferably from about 15 to about 25 microns. The first outer layer may comprise at least one material selected from the group consisting of low density polyethylene, linear low density polyethylene, metallocene-based linear low density polyethylene, polypropylene, copolymers of polypropylene, high-density polyethylene, ionomers, and mixtures thereof.

A second outer layer may have a thickness in the range of from about 10 to about 40 microns preferably from about 15 to about 25 microns.

The second outer layer may comprise at least one material selected from the group consisting of low density polyethylene, linear low density polyethylene, metallocene-based linear low density polyethylene, polypropylene, copolymers of polypropylene, high-density polyethylene, ionomers, and mixtures thereof.

Each bonding layer may have a thickness in the range of from about 1 to about 10 microns, and may be selected from the group consisting of ethylene vinyl acetate, ethylene methyl acrylate, and ethylene acrylic acid copolymer and ethylene vinyl acetate—maleic anhydride copolymer.

The thickness of the film may be in the range of from about 25 to about 300 microns, preferably from about 50 to about 100 microns.

An adjacent PVDC layer may be provided on each side of the EVOH layer.

Thus, in a multilayer plastic film in accordance with the invention, the EVOH is "locked up" in an adjacent PVDC layer. PVDC has better barrier properties not only for moisture and oxygen but also for aroma compared to polyolefins and polyamides which have conventionally been used to protect an EVOH layer in known multilayer plastic films.

A multilayer plastic film in accordance with the invention can be produced by methods such as blown film, cast film, lamination, extrusion coating and extrusion coating lamination. A multilayer plastic film in accordance with the invention can also be used to produce bottles and other containers by blow molding.

The present invention also provides a method of producing a multilayer plastic film including extruding multilayer plastic material in tubular bubble form to provide a multilayer plastic film having a series of component layers and bonding layers bonding said component layers together, said component layers including an inner hydrolysed ethylene vinyl acetate copolymer (EVOH) layer, an adjacent polyvinylidene chloride (PVDC) layer, and outer layers comprising a polyolefin homopolymer, copolymer or ionomer, and cooling and collapsing the tubular film to sheet form.

The above method may also include subsequently returning the collapsed film to a second tubular bubble form, stretching the second tubular bubble radially and longitudinally to produce a biaxially oriented heat shrinkable film, and collapsing the second tubular bubble to a further sheet form. The further sheet form may be partially cross-linked by exposure to high energy electrical radiation to improve the sealing properties of a sealing layer.

The present invention further provides a method of producing a multilayer plastic film including extruding multilayer plastic film in cast form to provide a multilayer plastic film having a series of component layers and bonding layers bonding said component layers together, said component layers including an inner hydrolysed ethylene vinylacetate copolymer (EVOH) layer, an adjacent polyvinylidene chloride (PVDC) layer, and outer layers comprising a polyolefin homopolymer, copolymer or ionomer, and cooling the film. The multilayer plastic film may be laminated to a web before cooling.

The present invention also provides a blow molded container formed from multilayer plastic film having a series of component layers and bonding layers bonding said component layers together, said component layers including an inner hydrolysed ethylene vinyl acetate copolymer (EVOH) layer, an adjacent polyvinylidene chloride (PVDC) layer, and outer layers comprising a polyolefin homopolymer, copolymer or ionomer.

DESCRIPTION OF THE DRAWINGS

Embodiments of the invention will now be described, by way of example, with reference to the accompanying drawings, of which.

DESCRIPTION OF PREFERRED EMBODIMENTS

Figure 1:
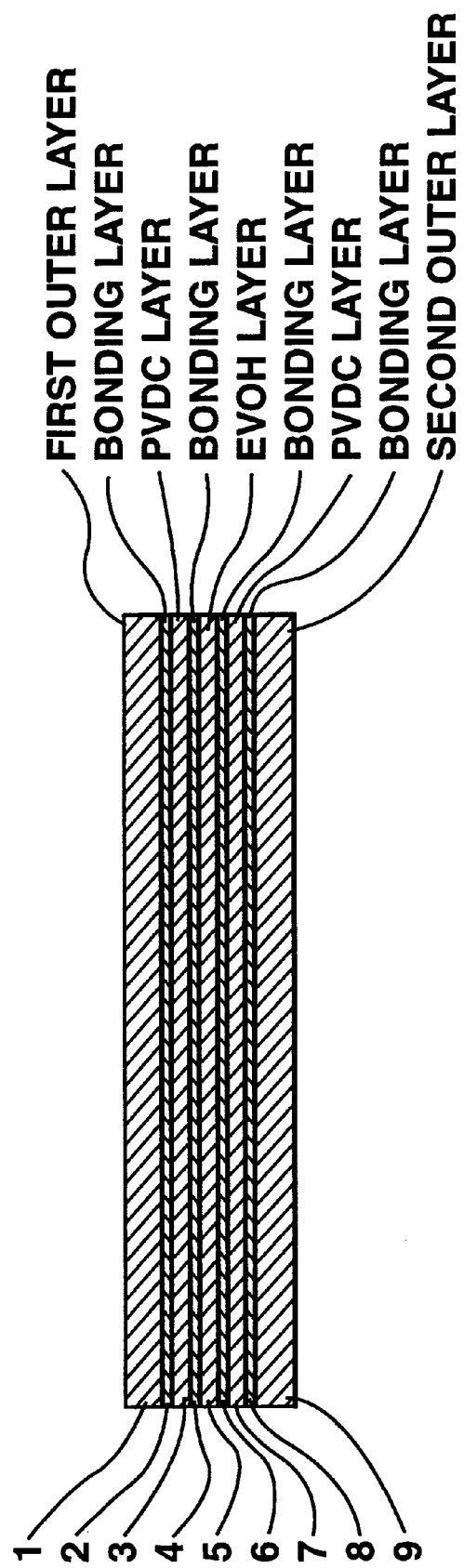
FIG. 1 is a cross-sectional view of a nine layer plastic film in accordance with one embodiment of the invention.

In one embodiment of the invention, a nine layer plastic film as (see FIG. 1) a series of components layers and bonding layers bonding the component layers together. One component layer is a central layer five of hydrolysed ethylene vinyl acetate copolymer (EVOH) with a melt index of from about 0.8 to about 8, preferably from about 1.6 to about 6, with ethylene content from about 27 to about 48 percent, preferably about 44 percent.

Component layers 3 and 7 on each side of the central EVOH layer 5 are of poly vinylidene chloride (PVDC) comprising vinylidene chloride-methyl acrylate copolymer with from about 70 to about 98 percent by weight of vinylidene chloride and from about 2 to about 30 percent by weight of methyl acrylate (or vinyl chloride or a suitable unsaturated monomer). The VDC resin contains small amounts of plastizer and stabilizers such as dioctil adipate and epoxyidized soybean oil as known in the art. The component layers one and nine, namely first and second outer layers, are of low density polyethylene with a melt index of from about 0.5 to about 6.0 decigram per minute.

Bonding layers 4 and 6 are of ethylene-vinyl acetate-malaic anhydride copolymer with a melt index of from about 0.1 to about 6.0 decigram per minute and a vinyl acetate content from about 9 to about 28 percent by weight, used on the weight of the ethylene vinyl acetate copolymer. Bonding layers 2 and 8 are of ethylene-vinyl acetate copolymer with a melt index of from about 0.1 to about 6 decigram per minute and a vinylacetate content of from about 9 to about 28 percent by weight.

In other embodiments, the outer layers may be of linear low density polyethylene, polypropylene, polystyrene, high density polyethylene and linear low-density polyethylene, or blends of polyolefins, polyamide or polyesters. Such polymers can also provide a sealant layer which may also include metallocene based plastomer, ethylene vinyl acetate, ionomers or blends of these materials. The bonding layers may alternatively be anhydride modified ethylene vinyl acetate, anhydride modified linear low density polyethylene, ethylene vinyl acetate, ethylene acrylic acid, ethylene methacrylic acid or salts of ethylene acrylic acid or methacrylic acid.

The PVDC layer or layers made the copolymer of vinylidene chloride may have from about 70 to about 98 percent by weight of this monomer and from about 2 to about 30 percent by weight of at least one unsaturated monomer which is copolymerizable with vinylidene chloride, such as methyl acrylate or vinyl chloride. The PVDC layer or layers may also contain additives such as heat stabilizers and plasticizing compounds such as epoxysidized soybean oil and steramide as known in the art. A certain amount of comonomer with vinylidene chloride is required for easy processability of PVDC copolymer but higher amounts of the comonomer in the copolymer lower the barrier properties of the PVDC.

The EVOH layer comprises hydrolysed ethylene-vinyl acetate copolymer, with an ethylene content from about 27 to about 48 mole percent. One of the PVDC layers and an adjacent bonding layer of the embodiment shown in FIG. 1 may be omitted. In this case, the resulting seven layer of film should be used in such a way that the PVDC side faces the higher moisture content side, which could be either the environment side or the packaged product side.

The abuse resistance, toughness and puncture resistance can be increased by forming an outside layer of co-extruded polyamide such as Nylon 6–12, Nylon 11, Nylon 12, Nylon 6, Nylon 6/66 or other polyesters. Another advantage to using co-extruded polyamide or polyester as an outside layer is when this layer is used as a seal through layer, because polyamides and polyesters usually have a higher melting point and therefore multilayer films containing polyamides as an outside layer can be sealed quicker with stronger seals. Materials such as Nylon 6 or Nylon 6/66 or certain polyesters have much higher melting points and can be coextruded as an outside layer with a multilayer film by an extrusion method such as described in U.S. patent application Ser. No. 08/947936 filed Oct. 9, 1997, the contents of which are hereby incorporated herein by reference.

Figure 2:
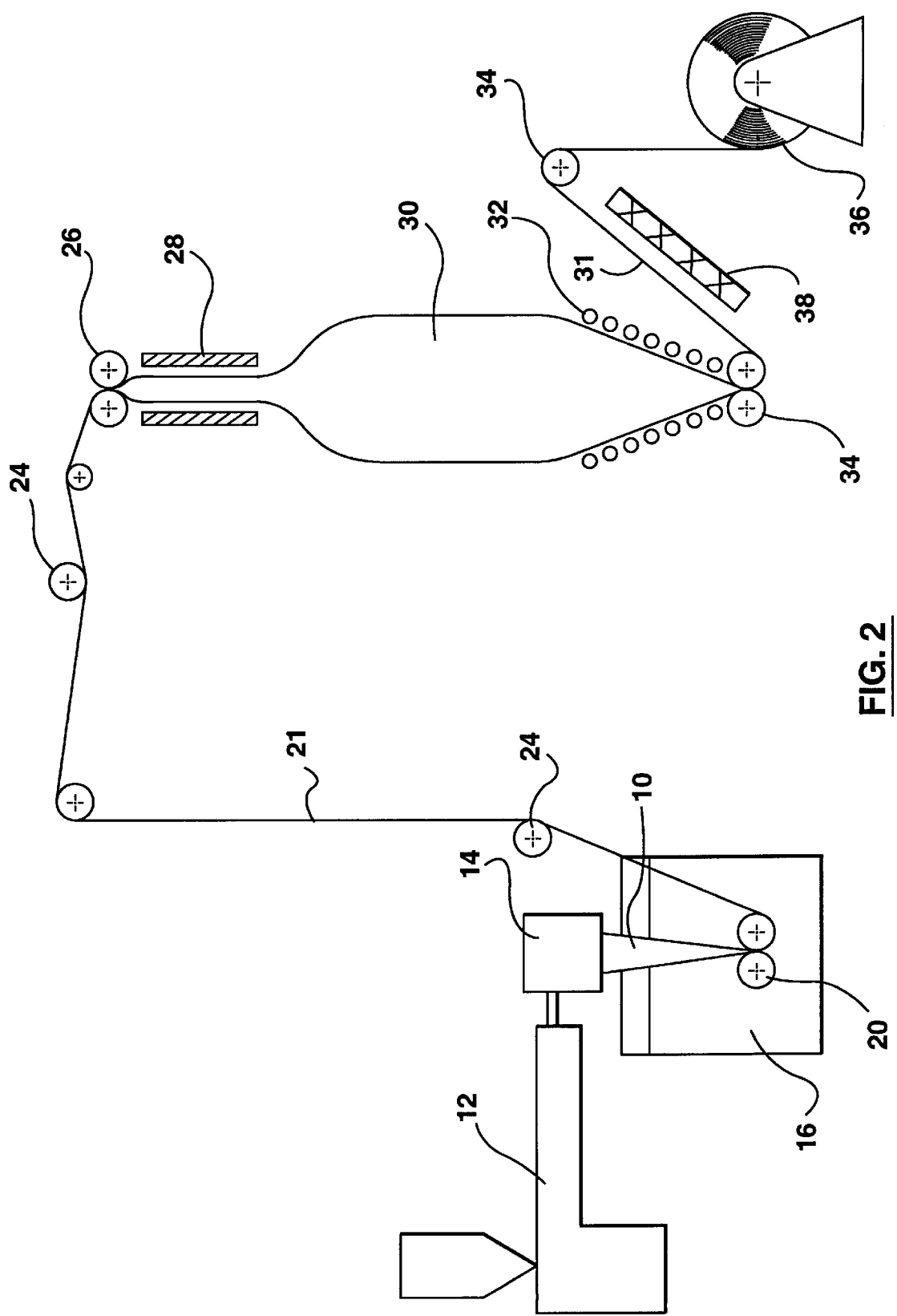
FIG. 2 is a schematic drawing showing the production of a biaxially oriented heat shrinkable multilayer plastic film in accordance with the invention by means of a double bubble blown film process.

A biaxially oriented heat shrinkable multilayer film in accordance with the present invention may be produced by the known double bubble method. Referring now to FIG. 2, a tubular nine layer film is produced by using nine extruders 12 (only one of which is shown). The polymers extruded by the extruders 12 are fed to an annular die 14, and the tubular film with nine layers is extruded downwardly therefrom. The tubular nine layer film is cooled in a cold water tank 16 located under the die 14 and containing water at a temperature of about 25 degrees C. or lower. The bubble 10 formed by the multilayer film is squeezed out by nip rolls 20 in the cold water tank 16 which collapse the film from bubble form to sheet form.

The cold water in the tank 16 quenches the tubular film to maintain the amorphous state of the plastic material and to lower the temperature thereof so that substantially no crystalline growth occurs in the PVDC layers which inhibit the subsequent process of orientation.

The collapsed film 21 from the cold water tank 16 is passed over the idler rolls 24 and through a pair of nip rolls 26. The collapsed film 21 is passed from the nip rolls 26 through an infrared heating section 28 and blown to form a second bubble 30, which is subsequently collapsed by a collapsing frame 32. The collapsed film 31 then passes through a pair of nip rolls 34 which are rotated three times faster than the nip rolls 26, with the air in the bubble 30 being entrapped therein by the rolls 26, 34. This results in biaxial orientation of the film lengthwise and breadthwise. The collapsed film 31 is then passed over further idler rolls 34 and wound in the form of a roll 36.

The collapsed film may travel past an annealing station 38 which stabilized the film to prevent shrinkage on the roll 36. The film may be slit to remove trim if desired.

Figure 3:
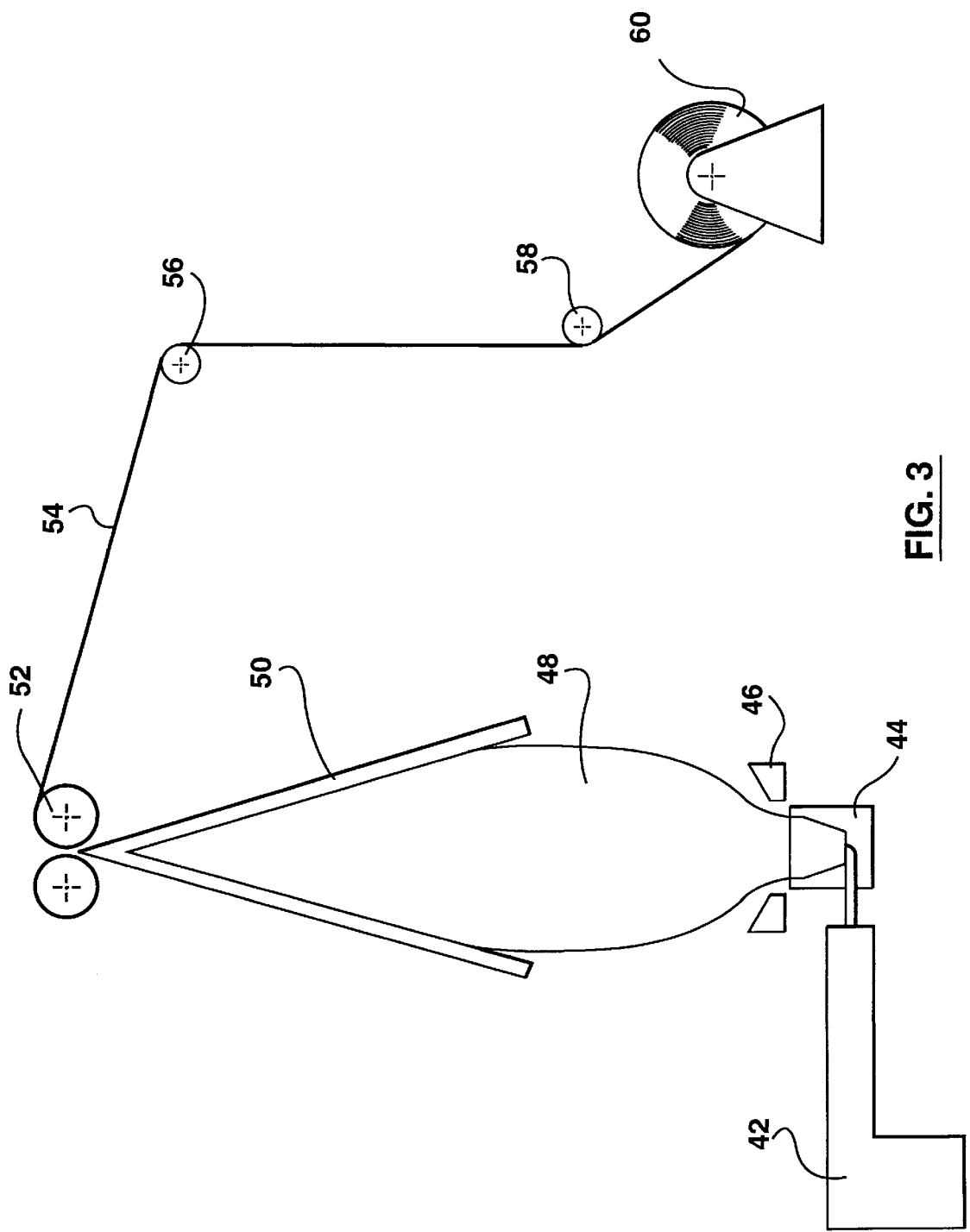
FIG. 3 is a schematic drawing showing the production of multilayer plastic film in accordance with the invention by means of a single bubble blown film process.

Multilayer film in accordance with the invention may also be produced by a single bubble blown film process. Referring now to FIG. 3, a tubular nine layer film is produced by using nine extruders 42 (only one of which is shown). The polymers extruded by the extruders 42 are fed to an annular die 44, and the tubular film is extruded upwardly therefrom through an air ring 46 which cools the film. Tubular film passes upwardly in the form of a bubble 48 to a collapsing frame 50 where the tubular film is collapsed into sheet form and passes through nip rolls 52. The flattened film 54 subsequently passes over idler rolls 56, 58 and is wound onto roll 60.

Use of this invention enables multilayer films to be produced in which each PVDC layer has a thickness less than about 15 microns and therefore has minimal susceptibility to cracking. Also because of the presence of a plurality of PVDC layers, the possibility of problems arising from pinholes therein is minimized since a pinhole in one layer is most unlikely to be aligned with a pinhole in another layer.

The dies 14 or 44 may be of the kind described in U.S. Pat. No. 5,788,902 (Planeta) issued Aug. 4, 1998 or in U.S. Pat. No. 6,116,885 (Planeta et al) issued Sep. 12, 2000 which describe and claim inventions relating to the extrusion of plastic materials in multilayer tubular film which is especially useful when one of the plastic materials (such as PVDC) is readily degradable. The contents of these two patent applications are hereby incorporated herein by reference.

Figure 4:
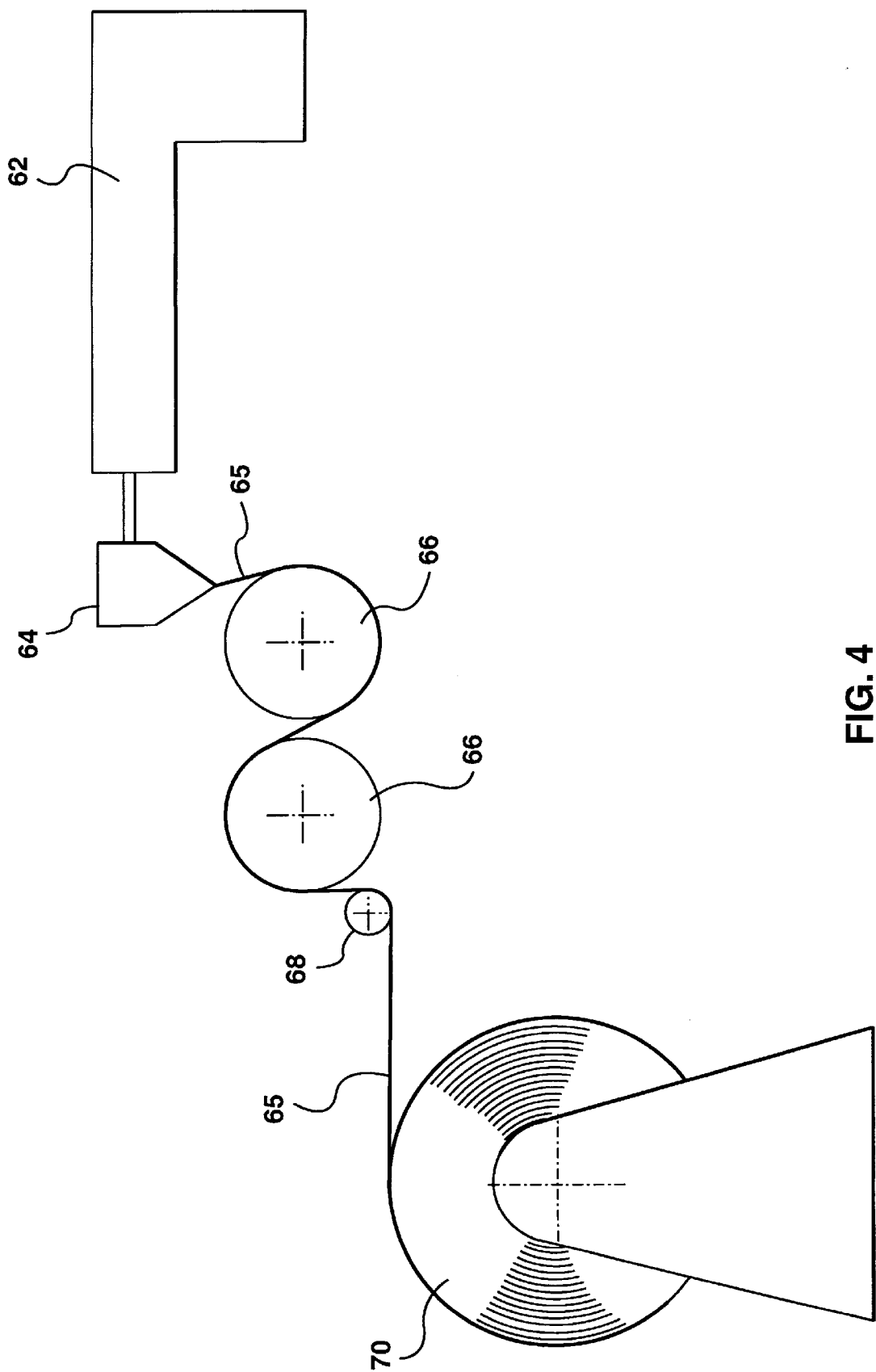
FIG. 4 is a schematic drawing showing the production of multilayer plastic film in accordance with the invention by means of cast film process.

Multilayer plastic film in accordance with the invention may also be produced by a cast film process. As shown in FIG. 4, a nine layer cast film is produced by using nine extruders 64 (only one of which is shown). The polymers extruded by the extruder 62 are fed to a flat die 64, and the resultant cast film 65 is passed downwardly therefrom around a pair of chill rollers 66 and an idler roller 68 before being wound onto a roll 70.

Figure 5:
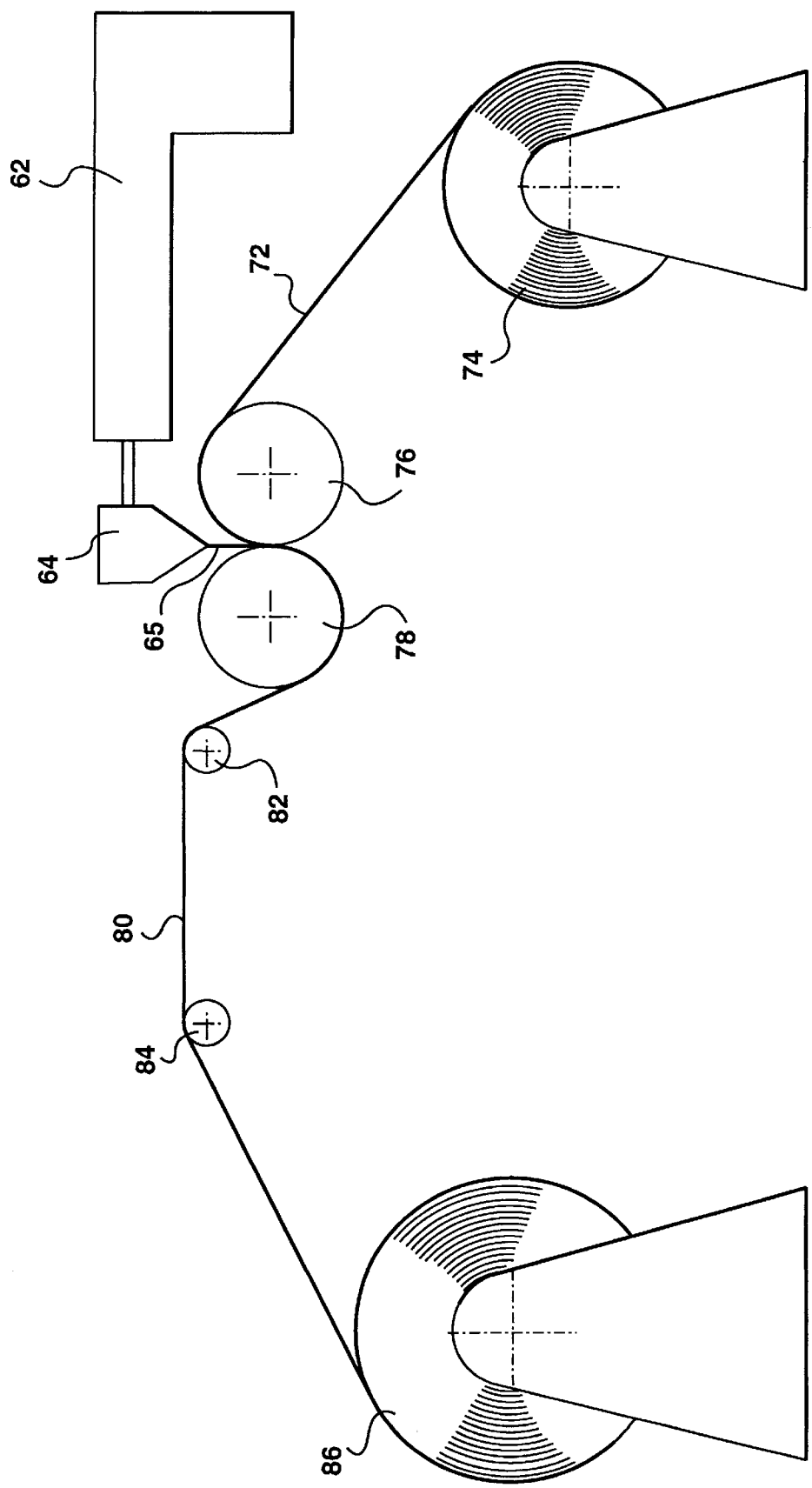
FIG. 5 is a schematic drawing showing the production of multilayer plastic film in accordance with the invention by means of an extrusion coating or lamination process.

As shown in FIG. 5, the multilayer cast plastic film produced as in FIG. 4 may also be coated on or laminated with a substrate web. The substrate web 72 is unwound from a supply roll 74 and passes around a rubber covered roller 76 and, with the multilayer cast plastic film 65, then passes between the nip formed by a chill roller 78 and the rubber covered roller 76 to produce a laminate 80 which passes around idler rollers 82, 84 before being wound onto a roll 86.

A tubular film produced in accordance with the invention may be used to form blow molded containers, which consequently have improved properties as described above, for example, improved oxygen and aroma barrier properties.

A specific example of the present invention will now be described.

EXAMPLE

Nine layer film was prepared by a conventional blown film process by coextruding the composition described below through a multilayer die, biaxially stretching the coextruded tubular film and winding the tube.

The outer layer 1 was of low density polyethylene with a melt index of 2.0 decigram per minute, bonding layers 4 and 6 were of ethylene vinylacetate-maleic anhydride having a melt index of 2.5 decigrams per minute and containing about 28 percent by weight of vinylacetate, and bonding layers 2 and 8 were of ethylene vinylacetate having a melt index of 2 to 6 decigram per minute and a vinyl acetate content of 28 percent by weight. PVDC layers 3 and 7 were of vinylidene chloridemethyl acrylate copolymer containing 94 percent by weight of vinylidene chloride and 6 percent by weight of methyl acrylate. EVOH layer 5 was of hydrolysed ethylene vinyl acetate having a melt index of 1.6 and an ethylene content of 44 percent.

The resulting biaxially oriented film had a thickness of 50 microns and showed good physical properties, especially those required for packaging cheese, meat and other food products.

Other embodiments and examples of the invention will be readily apparent to a person skilled in the art, the scope of the invention being defined in the appended claims.

What is claimed is:

1. A multilayer plastic film having a series of component layers and bonding layers bonding said component layers together, said component layers including:
   an inner hydrolysed ethylene vinyl acetate copolymer (EVOH) layer, an adjacent polyvinylidene chloride (PVDC) layer on each side of the EVOH layer, and outer layers comprising a polyolefin homopolymer, copolymer or ionomer.

2. A multilayer plastic film according to claim 1 wherein said inner EVOH layer has a thickness in the range of from about 2 to about 20 microns.

3. A multilayer plastic film according to claim 2 wherein said inner EVOH layer has a thickness in the range of from about 5 to about 15 microns.

4. A multilayer plastic film according to claim 1 wherein each said adjacent PVDC layer comprises from about 85 to about 98 percent by weight of vinylidene chloride.

5. A multilayer plastic film according to claim 1 wherein each said adjacent PVDC comprises at least one copolymer selected from the group consisting of vinylidene chloride-methyl acrylate copolymer, vinylidene chloride-vinyl chloride copolymer and a copolymer of vinylidene chloride with an unsaturated monomer.

6. A multilayer plastic film according to claim 1 wherein each said adjacent PVDC layer has a thickness in the range of from about 2 to about 30 microns.

7. A multilayer plastic film according to claim 4 wherein each said adjacent PVDC layer has a thickness in the range of from about 5 to about 15 microns.

8. A multilayer plastic film according to claim 1 wherein a first outer layer has a thickness in the range of from about 10 to about 40 microns.

9. A multilayer plastic film according to claim 8 wherein the first outer layer has a thickness in the range of from about 15 to about 25 microns.

10. A multilayer plastic film according to claim 1 wherein a first outer layer comprises at least one material selected from the group consisting of low density polyethylene, linear low density polyethylene, metallocene-based linear low density polyethylene, polypropylene, copolymers of polypropylene, high-density polyethylene, ionomers, and mixtures thereof.

11. A multilayer plastic film according to claim 1 wherein a second outer layer has a thickness in the range of from about 10 to about 40 microns.

12. A multilayer plastic film according to claim 10 wherein the second outer layer has a thickness in the range of from about 15 to about 25 microns.

13. A multilayer plastic film according to claim 1 wherein a second outer layer comprises at least one material selected from the group consisting of low density polyethylene, linear low density polyethylene, metallocene-based linear low density polyethylene, polypropylene, copolymers of polypropylene, high-density polyethylene, ionomers, and mixtures thereof.

14. A multilayer plastic film according to claim 1 wherein each bonding layer has a thickness in the range of from about 1 to about 10 microns.

15. A multilayer plastic film according to claim 1 wherein each bonding layer comprises at least one material selected from the group consisting of ethylene vinyl acetate, ethylene methyl acrylate, ethylene acrylic acid copolymer and ethylene vinyl acetate—maleic anhydride copolymer.

16. A multilayer plastic film according to claim 1 wherein the thickness of said film is in the range of from about 25 to about 300 microns.

17. A multilayer plastic film according to claim 16 wherein the thickness of said film is in the range of from about 50 to about 100 microns.

* * * * *